(12) United States Patent
Richter et al.

(10) Patent No.: US 12,461,648 B2
(45) Date of Patent: Nov. 4, 2025

(54) WRITE COMPLETION PACING FOR UNBALANCED COMMAND LENGTH

(71) Applicant: Sandisk Technologies, Inc., Milpitas, CA (US)

(72) Inventors: Elkana Richter, Tene (IL); Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 7 days.

(21) Appl. No.: 18/218,843

(22) Filed: Jul. 6, 2023

(65) Prior Publication Data

US 2024/0201847 A1    Jun. 20, 2024

Related U.S. Application Data

(60) Provisional application No. 63/433,675, filed on Dec. 19, 2022.

(51) Int. Cl.
  *G06F 12/00*    (2006.01)
  *G06F 3/06*    (2006.01)

(52) U.S. Cl.
  CPC .......... *G06F 3/0604* (2013.01); *G06F 3/0659* (2013.01); *G06F 3/0679* (2013.01)

(58) Field of Classification Search
  CPC .... G06F 3/0604; G06F 3/0659; G06F 3/0679; G06F 3/061
  See application file for complete search history.

(56) References Cited

U.S. PATENT DOCUMENTS

| | | | |
|---|---|---|---|
| 9,870,157 B2 | 1/2018 | Halaharivi et al. | |
| 9,933,975 B1 | 4/2018 | Ngu | |
| 10,459,634 B2 | 10/2019 | Benisty et al. | |
| 11,042,300 B2 | 6/2021 | Olcay et al. | |
| 11,221,972 B1 | 1/2022 | Raman et al. | |
| 2004/0088479 A1* | 5/2004 | Hall ...................... | G06F 3/0659 711/112 |
| 2015/0121021 A1* | 4/2015 | Nakamura ............ | G06F 3/0659 711/159 |
| 2016/0291884 A1 | 10/2016 | Halaharivi et al. | |
| 2016/0357474 A1* | 12/2016 | Frid ...................... | G06F 3/0683 |
| 2020/0278808 A1* | 9/2020 | Zhu ...................... | G06F 3/0659 |
| 2020/0333975 A1* | 10/2020 | Benisty ................ | G06F 3/0679 |
| 2022/0113906 A1 | 4/2022 | Hall | |
| 2022/0300205 A1 | 9/2022 | Lee | |

* cited by examiner

*Primary Examiner* — Arvind Talukdar
(74) *Attorney, Agent, or Firm* — Patterson + Sheridan, LLP

(57) ABSTRACT

A data storage device includes a memory device and a controller coupled to the memory device. When a command is received by the controller from a host device, the controller determines whether the command size is greater than a threshold size. If the command is not greater than the threshold size, the command is sent to a first queue, otherwise, the command is sent to a second queue. Commands are executed from the first queue until a command size tracker value, which increases by a size representative of each command executed from the first queue, equals or exceeds a threshold value. When the command size tracker value equals or exceeds the threshold value, a command from the second queue is executed and the command size tracker value decreases by a size representative of the command from the second queue. Completion messages are sent at specific intervals based on the executing.

18 Claims, 8 Drawing Sheets

WRITE COMPLETION PACING FOR UNBALANCED COMMAND LENGTH

CROSS-REFERENCE TO RELATED APPLICATIONS

This application claims benefit of United States Provisional Patent Application Ser. No. 63/433,675, filed Dec. 19, 2022, which is herein incorporated by reference.

BACKGROUND OF THE DISCLOSURE

Field of the Disclosure

Embodiments of the present disclosure generally relate to data storage devices, such as solid state drives (SSDs), and, more specifically, improving quality of service (QOS) of handling completion messages.

Description of the Related Art

Non-Volatile Memory Express (NVMe) is a scalable host-controller interface designed to address the needs of both enterprise systems and client systems that utilize SSDs having Peripheral Component Interconnect Express (PCIe) protocol. A requirement for an NVMe system is QoS, where the QoS in the NVMe system may be determined by the rate that the SSD replies to a host device responsive to a host command. In the NVMe command flow, the command is sent from the host device to the data storage device (i.e., SSD). The data storage device executes the command and sends a response back to the host device. In some systems, the host device may require the data storage device to send the completion message (i.e., the response based on executing the command) in a specific interval regardless of the length of the command. However, because different command lengths result in different response times, the QoS of the system may be decreased as a result of the rate of the responses not conforming to the requirements set by the host device.

Therefore, there is a need in the art for improved completion message handling in order to satisfy the requirement to have a constant interval between sending completion messages to a host device.

SUMMARY OF THE DISCLOSURE

The present disclosure generally relates to data storage devices, such as SSDs, and, more specifically, improving QoS of handling completion messages. A data storage device includes a memory device and a controller coupled to the memory device. When a command is received by the controller from a host device, the controller determines whether the command size is greater than a threshold size. If the command is not greater than the threshold size, the command is sent to a first queue, otherwise, the command is sent to a second queue. Commands are executed from the first queue until a command size tracker value, which increases by a size representative of each command executed from the first queue, equals or exceeds a threshold value. When the command size tracker value equals or exceeds the threshold value, a command from the second queue is executed and the command size tracker value decreases by a size representative of the command from the second queue. Completion messages are sent at specific intervals based on the executing.

In one embodiment, a data storage device includes a memory device and a controller coupled to the memory device. The controller is configured to receive a command from a host device, wherein the command has a first size, determine that the first size is less than or equal to a threshold size, store the command in a first queue responsive to determining that the first size is less than or equal to the threshold size, increase a command size tracker value responsive to executing the command from the first queue, and execute a command stored in a second queue when the command size tracker value is greater than or equal to a threshold value, wherein the command stored in the second queue has a second size that is greater than the threshold size.

In another embodiment, a data storage device includes a memory device and a controller coupled to the memory device. The controller includes a completion manager configured to send completion messages to a host device for executed commands received from the host device and a scheduler. The scheduler is configured to queue a command received from the host device having a size less than or equal to a threshold size in a first queue, queue a command received from the host device having a size greater than the threshold size in a second queue, determine to execute, based on a command size tracker value being less than or equal to a threshold value, a command from the first queue or, based on the command size tracker value being greater than the threshold value, a command from the second queue, and execute the command from the first queue or the command from the second queue based on the determining.

In another embodiment, a data storage device includes memory means and a controller coupled to the memory means. The controller is configured to determine that a command size tracker value exceeds a threshold value, wherein the command size tracker value is increased by a value representative of a size of a command executed from a first queue, wherein commands stored in the first queue have a size less than or equal to a threshold size, wherein the command size tracker value is decreased by a value representative of a size of a command executed from a second queue, wherein commands stored in the second queue have a size greater than the threshold size, and wherein the value representative of the size of the command executed from the first queue is less than the value representative of the size of the command executed from the second queue, and execute a command from the second queue when the command size tracker value exceeds the threshold value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as SSDs, and, more specifically, improving QoS of handling completion messages. A data storage device includes a memory device and a controller coupled to the memory device. When a command is received by the controller from a host device, the controller determines whether the command size is greater than a threshold size. If the command is not greater than the threshold size, the command is sent to a first queue, otherwise, the command is sent to a second queue. Commands are executed from the first queue until a command size tracker value, which increases by a size representative of each command executed from the first queue, equals or exceeds a threshold value. When the command size tracker value equals or exceeds the threshold value, a command from the second queue is executed and the command size tracker value decreases by a size representative of the command from the second queue. Completion messages are sent at specific intervals based on the executing.

Figure 1:
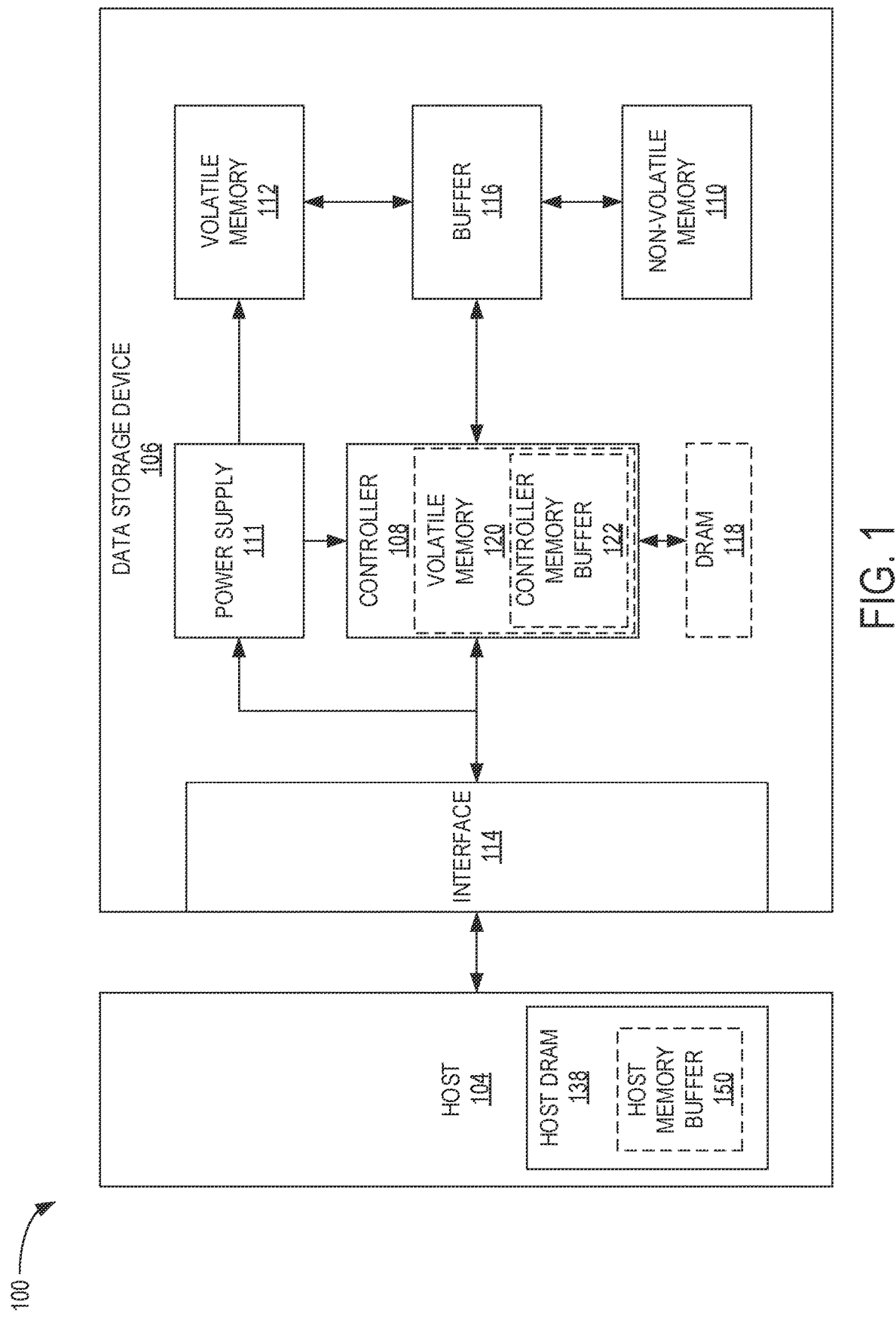
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the Interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of Interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
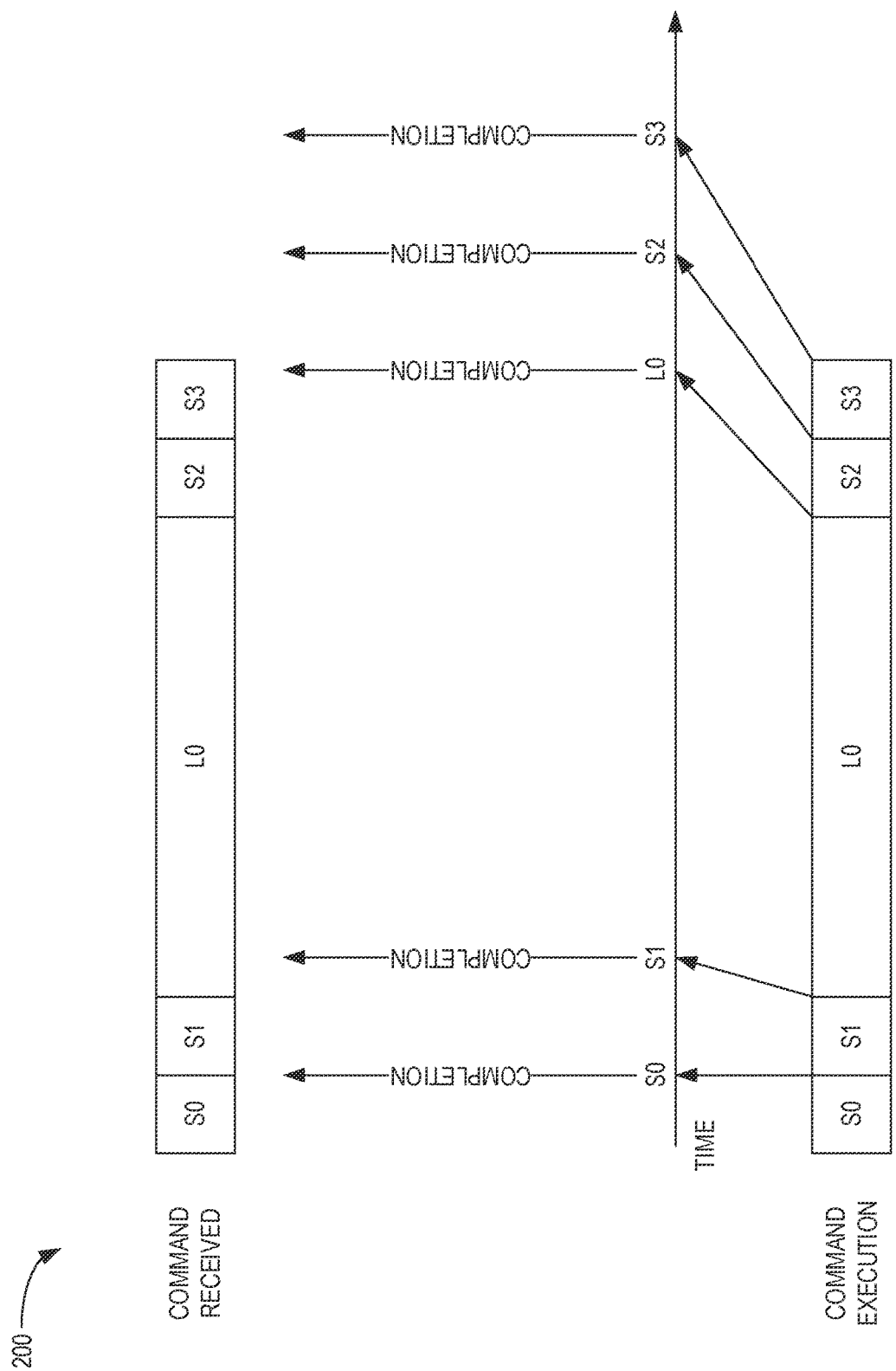
FIG. 2 is an exemplary illustration of a timing graph of sending completion messages responsive to received commands, according to certain embodiments.

FIG. 2 is an exemplary illustration of a timing graph 200 of sending completion messages responsive to received commands, according to certain embodiments. For exemplary purposes, aspects of the storage system 100 of FIG. 1 may be referenced herein. Commands are received from the host device 104 by the controller 108. In the timing graph 200, 5 commands are received by the controller 108 in the following order: S0, S1, L0, S2, S3, where "S#" corresponds with a short command and "L#" corresponds with a long command. A short command may refer to a command length that is less than or equal to a threshold size and a long command refer to a command length that is greater than the threshold size.

It is to be understood that the threshold size may be a static threshold size or a dynamic threshold size. In cases where the threshold size is a static threshold size, the threshold size may be set after a reset event, such as the data storage device restarting, coming out of a power off mode, restoration from a low power mode to an operational power mode, and the like. Likewise, in cases where the threshold size is a dynamic threshold size, the threshold size may be initially set after a reset event and changed during the operation of the data storage device. For example, the changing may be based on a moving average of a command size of "n" number of recently received commands, where "n" is any value applicable to the described embodiments.

As shown in the timing graph 200, completion messages are sent to the host device 104 in the order that the commands were received at the controller 108. Thus, there is a gap in time between sending a completion message for S1 and a completion message for L0 due to the size of the L0 command.

Figure 3:
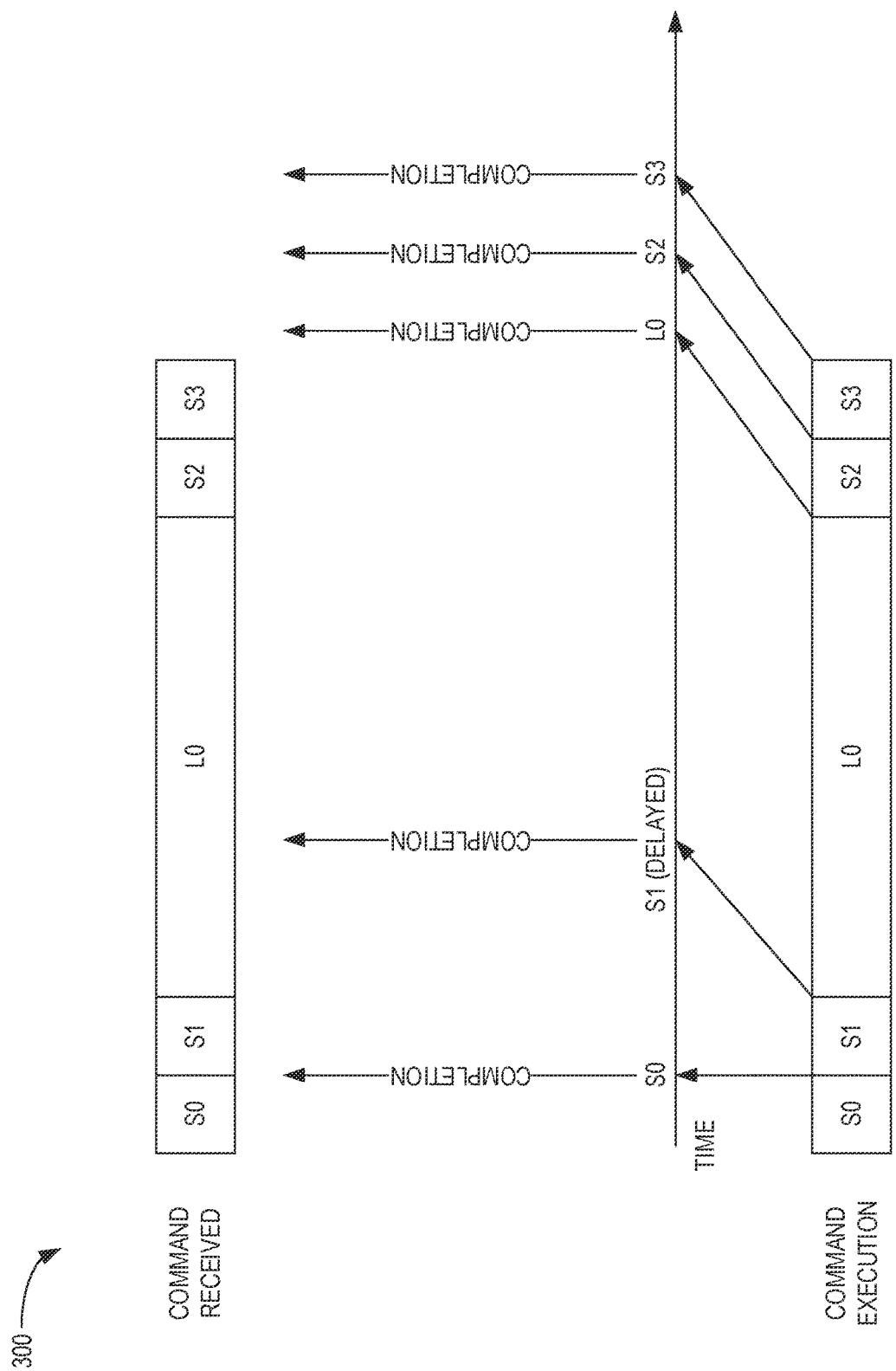
FIG. 3 is an exemplary illustration of a timing graph of sending completion messages responsive to received commands, according to certain embodiments.

FIG. 3 is an exemplary illustration of a timing graph 300 of sending completion messages responsive to received commands, according to certain embodiments. For exemplary purposes, aspects of the storage system 100 of FIG. 1 may be referenced herein. Commands are received from the host device 104 by the controller 108. In the timing graph 300, 5 commands are received by the controller 108 in the following order: S0, S1, L0, S2, S3, where "S#" corresponds with a short command and "L#" corresponds with a long command. A short command may refer to a command length that is less than or equal to a threshold size and a long command refer to a command length that is greater than the threshold size.

As shown in the timing graph 300, completion messages are sent to the host device 104 in the order that the commands were received at the controller 108. Furthermore, the controller 108 may delay sending a completion message to the host device. As shown in the timing graph 300, sending the completion message for S1 is delayed. However, because the large gap is created due to executing the L0 command, the completion messages sent afterwards may be sent without a delay in order to compensate for the time gap of executing the L0 command.

Figure 4:
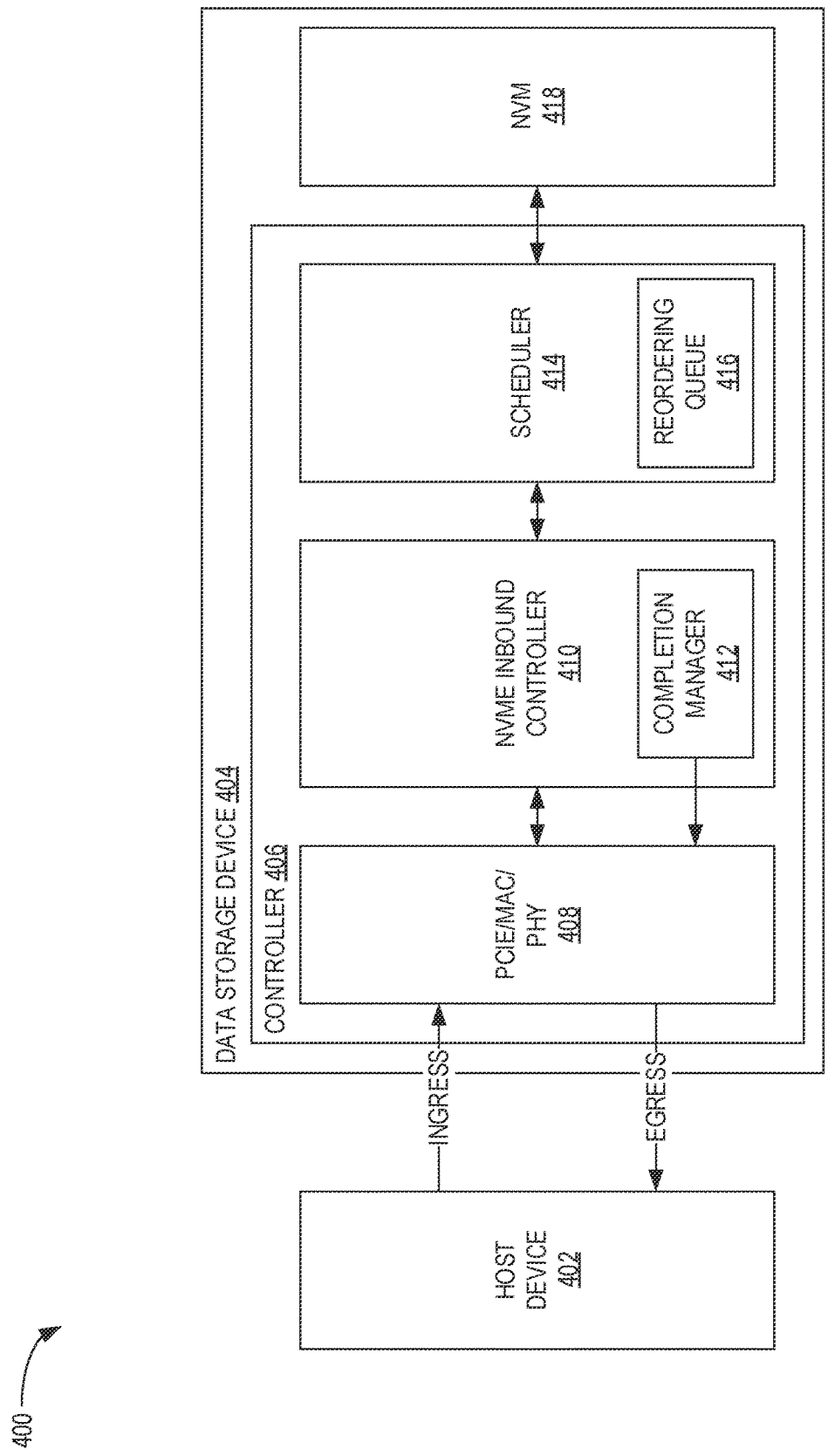
FIG. 4 is a schematic block diagram illustrating a storage system in which a controller of a data storage device is capable of reordering received commands, according to certain embodiments.

FIG. 4 is a schematic block diagram illustrating a storage system 400 in which a controller of a data storage device is capable of reordering received commands, according to certain embodiments. Storage system 400 may be the storage system 100 of FIG. 1. Storage system 400 includes a host device 402 coupled to a data storage device 404. The data storage device 404 includes a controller 406 coupled to an NVM 418. It is to be understood that storage system 400 may include additional components not shown in FIG. 4 for the sake of clarity.

The controller 406 includes a PCIe/MAC/PHY interface 408, an NVMe inbound controller 410, and a scheduler 414. Commands and data are passed to (i.e., via the ingress bus) the PCIe/MAC/PHY interface 408 from the host device 402 and sent from (i.e., via the egress bus) the PCIe/MAC/PHY interface 408 to the host device 402. Completion messages are sent to the host device 402 through the egress bus form the PCIe/MAC/PHY interface 408. When commands and data associated with the commands are received at the PCIe/MAC/PHY interface 408, the commands and data associated with the commands are passed to the NVMe inbound controller 410.

The NVMe inbound controller 410 may be configured to handle the data transfers on the ingress bus and may determine where to send the data to within the data storage device (e.g., a specific memory location of the NVM 418). The NVMe inbound controller 410 includes a completion manager 412. The completion manager 412 may be configured to delay sending completion messages to the host device 402. The NVMe inbound controller 410 passes the commands and the data associated with the commands to the scheduler 414, where the scheduler 414 manages the traffic inside the controller 406 as well as schedules the commands to be executed to the NVM 418.

The scheduler 414 includes a reordering queue module 416. The scheduler 414 may utilize the reordering queue module 416 to reorder received commands in order to execute the commands in a different order than an original order. In other words, if commands are received in the order of: S0, S1, L0, S2, S3, the scheduler 414 may utilize the reordering queue module 416 to reorder the commands so that the commands will be executed in the order of: S0, S1, S2, S3, L0.

Figure 5:
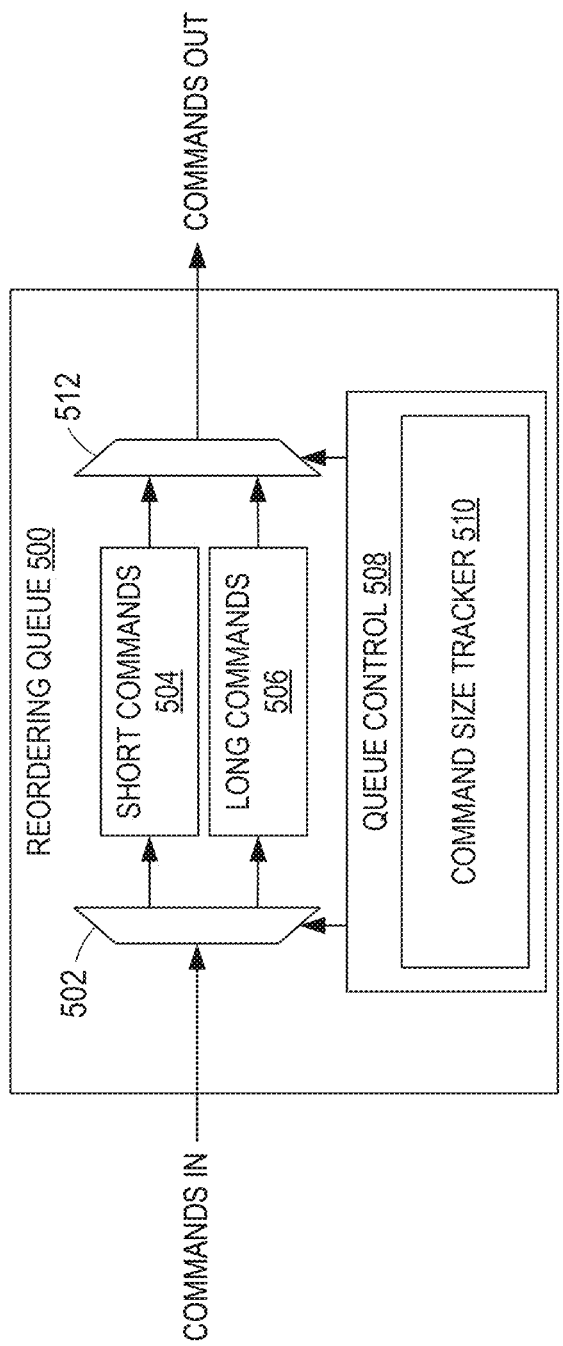
FIG. 5 is a schematic block diagram illustrating a reordering queue module, according to certain embodiments.

FIG. 5 is a schematic block diagram illustrating a reordering queue module 500, according to certain embodiments. The reordering queue module 500 may be the reordering queue module 416 of the scheduler 414 of FIG. 4. The reordering queue module 500 includes a first mux 502, a short commands queue 504, a long commands queue 506, a second mux 512, and a queue control module 508. The queue control module 508 includes a command size tracker 510. Commands are received by the reordering queue module 500 at the first mux 502, where short commands are sent to (i.e., queued in) the short commands queue 504 and long commands are sent to (i.e., queued in) the long commands queue 506. It is contemplated that the reordering queue module 500 may be implemented per submission queue of the data storage device or the host device, per virtual function associated with the data storage device, per physical function associated with the data storage device, per stream, per namespace, and the like. Commands are executed from a specific queue (e.g., the short commands queue 504 or the long commands queue 506) based on whether a command tracker size value is less than a threshold value. For example, if the command tracker size value is less than the threshold value, commands are provided to the second mux 512 from the short commands queue 504 to be executed. However, when the command tracker size value is greater than or equal to the threshold value, commands are provided to the second mux from the long commands queue 506 to be executed.

It is to be understood that the threshold value may be a static threshold value or a dynamic threshold value. In cases where the threshold value is a static threshold value, the threshold value may be set after a reset event, such as the data storage device restarting, coming out of a power off mode, restoration from a low power mode to an operational power mode, and the like. Likewise, in cases where the threshold value is a dynamic threshold value, the threshold value may be initially set after a reset event and changed during the operation of the data storage device. For example, the changing may be based on a moving average of a command size of "n" number of recently received commands, where "n" is any value applicable to the described embodiments. Furthermore, the threshold value may be set based on the following equation:

$$\text{THRESHOLD VALUE} = M + N * (\text{TRACKER SIZE}) \quad (1)$$

In equation (1), M corresponds to a constant in order to ensure that the time that the data storage device takes to handle a command is not entirely related to the length of the command and N corresponds to a translation of the actual size of the command to a time that the data storage device would take to handle the command. It is to be understood that other equations for setting the threshold values may be applicable to the described embodiments. The threshold value is set so that completion commands may be sent to the host device at timed intervals in order to satisfy a QoS requirement of receiving completion messages from a data storage device.

The queue control module 508 utilizes the command size tracker 510 to keep track of the command size tracker value of the system. For example, each time a command is executed from the short commands queue 504, the command size tracker value of the command size tracker 510 is increased. In one example, the command size tracker value may be increased by a set value for each command executed from the short commands queue 504. In another example, the command size tracker value may be incremented by a value representative of the size of the command executed from the short commands queue 504. Likewise, each time a command is executed from the long commands queue 506, the command size tracker value of the command size tracker 510 is decreased. In one example, the command size tracker value may be decreased by a set value for each command executed from the long commands queue 506. In another example, the command size tracker value may be decreased by a value representative of the size of the command executed from the long commands queue 506.

When the command size tracker value is less than the threshold value, commands are served (i.e., executed) from the short commands queue 504. However, when the command size tracker value is equal to or greater than the threshold value, commands are served (i.e., executed) from the long commands queue 506. In other words, the queue control module 508 may determine which queue, either the short commands queue 504 or the long commands queue 506, to execute commands from based on the command size tracker value tracked by the command size tracker 510. Furthermore, by utilizing the reordering queue module 500, commands may be executed out of order form an original order (i.e., an arrival order).

Figure 6:
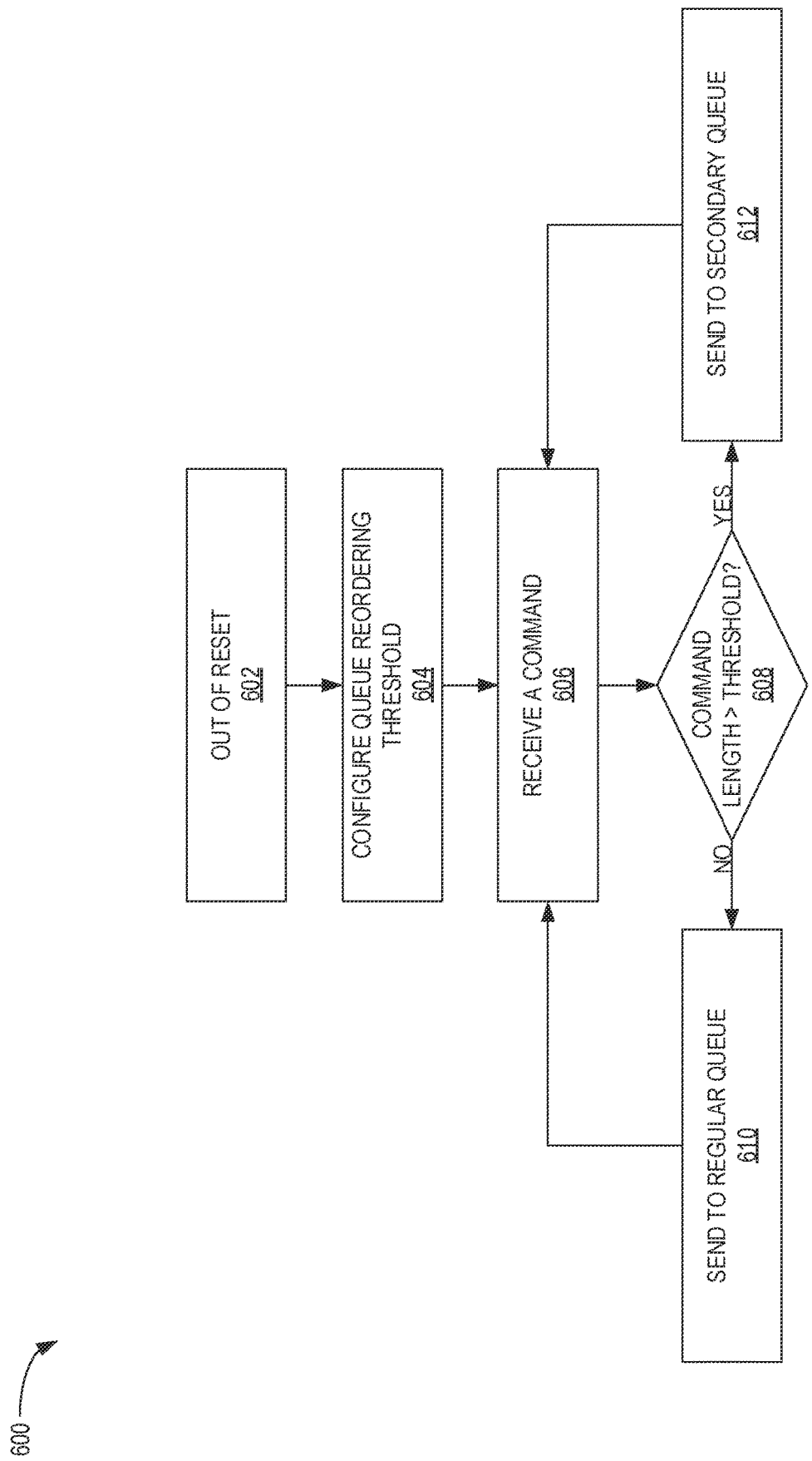
FIG. 6 is a flow diagram illustrating a method of separating commands by a command length into either a regular queue or a secondary queue, according to certain embodiments.

FIG. 6 is a flow diagram illustrating a method 600 of separating commands by a command length into either a regular queue or a secondary queue, according to certain embodiments. Method 600 may be implemented by the controller 406 of FIG. 4. For exemplary purposes, aspects of the storage system 400 and the reordering queue module 500 may be referenced herein.

At block 602, the data storage device 404 is out of a reset mode, such as when the data storage device 404 is powered on, awoken from a low power mode, restarted, and the like. At block 604, the queue control module 508 determines the queue reordering threshold (i.e., a threshold size) for determining whether commands received from the host device 402 should be placed in a regular queue (e.g., the short commands queue 504) or in a secondary queue (e.g., the long commands queue 506). At block 606, the controller 406 receives a command. At block 608, the queue control module 508 determines whether the command length (i.e., the command size) is greater than the threshold size set at block 604. If the command length is not greater than (i.e., is less than or equal to) the threshold value at block 608, then the command is sent to (i.e., queued in) the regular queue (e.g., the short commands queue 504). However, if the command length (i.e., the command size) is greater than the threshold size at block 608, the command is sent to the secondary queue (e.g., the long commands queue 506).

Figure 7:
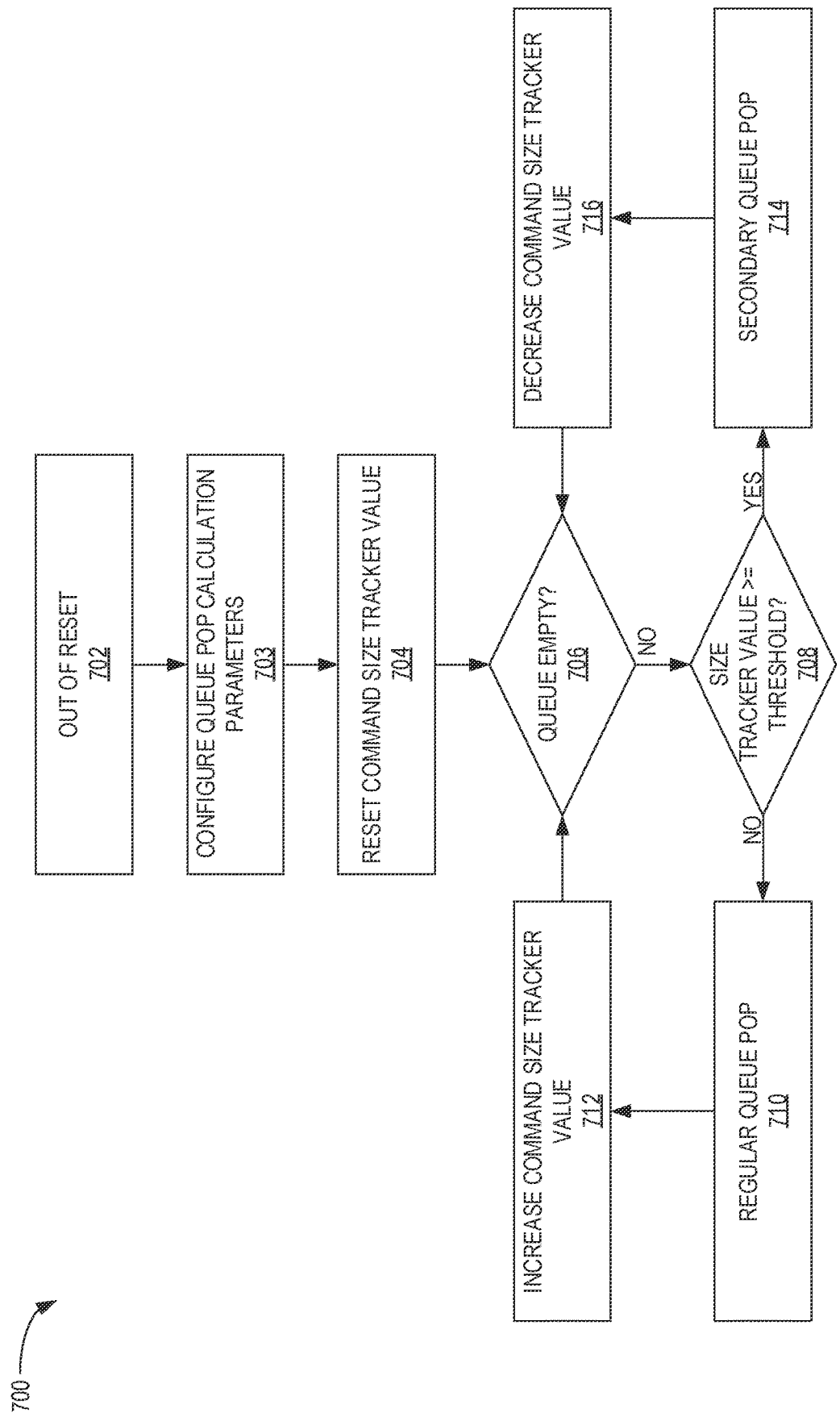
FIG. 7 is a flow diagram illustrating a method of executing a command from either the regular queue or the secondary queue based on a command size tracker value, according to certain embodiments.

FIG. 7 is a flow diagram illustrating a method 700 of executing a command from either the regular queue, such as the short commands queue 504 of FIG. 5, or the secondary queue, such as the long commands queue 506 of FIG. 5, based on a command size tracker value, according to certain embodiments. Method 700 may be implemented by the controller 406 of FIG. 4. For exemplary purposes, aspects of the storage system 400 and the reordering queue module 500 may be referenced herein.

At block 702, the data storage device 404 is out of a reset mode, such as when the data storage device 404 is powered on, awoken from a low power mode, restarted, and the like. At block 703, the queue control module 508 configures the queue pop calculation parameters. In other words, the threshold value is set. At block 704, the command size tracker 510 resets the command size tracker value. At block 706, the queue control module 508 determines if both queues (e.g., the short commands queue 504 and the long commands queue 506) are empty. If both queues are empty at block 706, method 700 pauses until a command is queued in either queue. However, if either queue is not empty at block 706, then the queue control module 508 determines if the size tracker value is greater than the threshold value, set at block 703, at block 708.

If the size tracker value is less than the threshold value at block 708, then the regular queue (e.g., the short commands queue 504) is popped, where a command is served from the regular queue (e.g., the short commands queue 504) to be executed at block 710. When the regular queue (e.g., the short commands queue 504) is popped at block 710, the command size tracker 510 increases the command size tracker value at block 712, which may be increased by a set value or increased by a value representative of the size of the command popped from the regular queue (e.g., the short commands queue 504).

However, if the size tracker value is greater than or equal to the threshold value at block 708, then the secondary queue (e.g., the long commands queue 506) is popped, where a command is served from the secondary queue (e.g., the long commands queue 506) to be executed at block 714. When the secondary queue (e.g., the long commands queue 506) is popped at block 714, the command size tracker decreases the command size tracker value at block 716, which may be decreased by a set value or increased by a value representative of the size of the command popped from the secondary queue (e.g., the long commands queue 506). It is to be understood that the queue control module 508 may service a command from the secondary queue (e.g., the long commands queue 506) when a timeout has occurred even though the command size tracker value is not greater than or equal to the threshold value.

Figure 8:
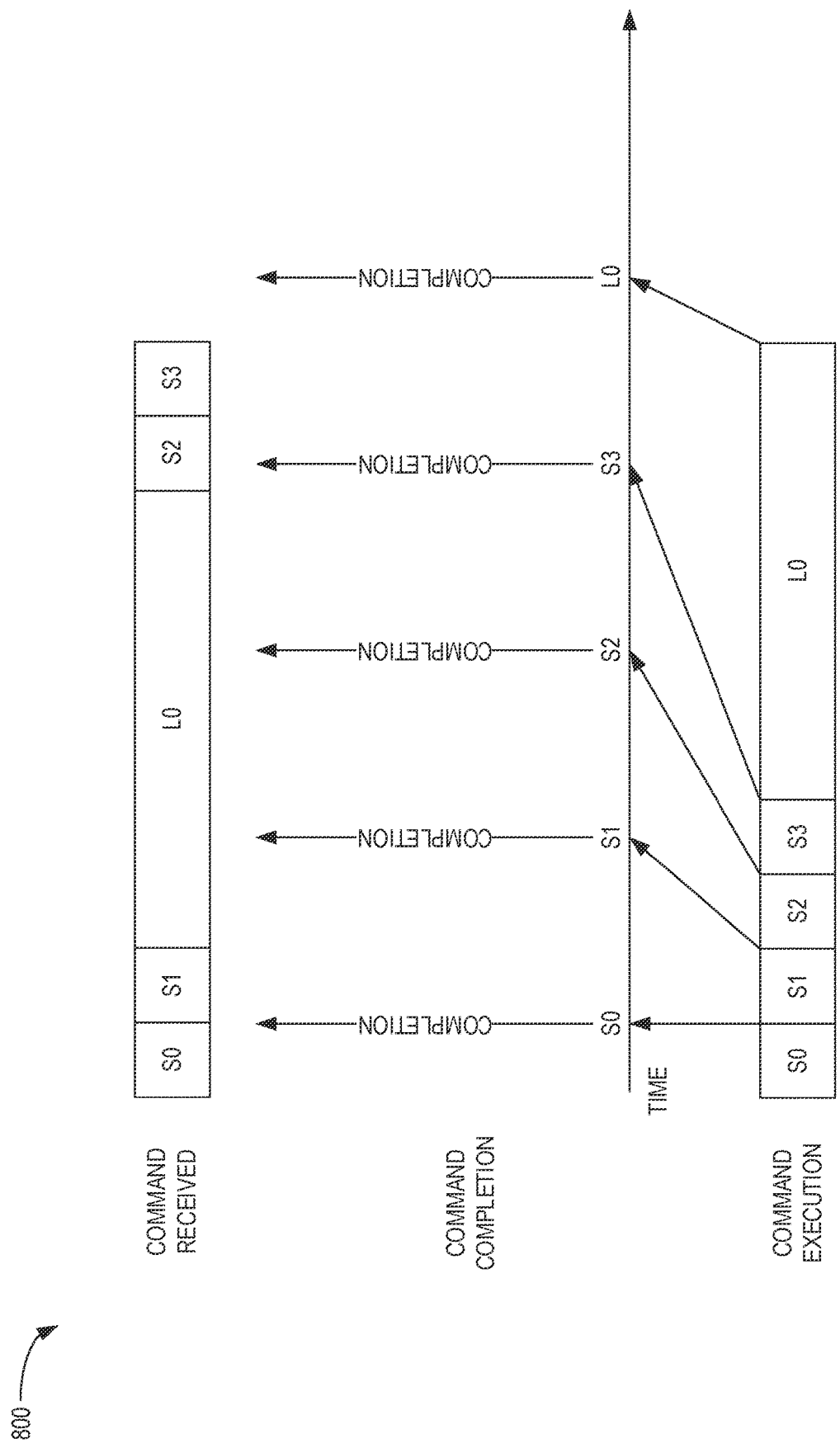
FIG. 8 is an exemplary illustration of a timing graph of sending completion messages responsive to received commands, according to certain embodiments.

FIG. 8 is an exemplary illustration of a timing graph 800 of sending completion messages responsive to received commands, according to certain embodiments. For exemplary purposes, aspects of the storage system 400 of FIG. 4 and the reordering queue module 500 of FIG. 5 may be referenced herein. Commands are received from the host device 402 by the controller 406. In the timing graph 800, 5 commands are received by the controller 108 in the following order: S0, S1, L0, S2, S3, where "S#" corresponds with a short command and "L#" corresponds with a long command. A short command may refer to a command length that is less than or equal to a threshold size and a long command refer to a command length that is greater than the threshold size.

As shown in the timing graph 800, completion messages are sent to the host device 402 out of order from an original order corresponding to the order that the commands were received at the controller 406. Utilizing the reordering queue module 500 and methods 600, 700, the received commands are reordered and executed in an order that satisfies a timed interval requirement. When command S0 is received, command S0 is queued in the short commands queue 504. When command S1 is received, command S1 is queued in the short commands queue 504. When command L0 is received, command L0 is queued in the long commands queue 506. When command S2 is received, command S2 is queued in the short commands queue 504. When command S3 is received, command S3 is queued in the short commands queue 504.

Because the command size tracker value is less than the threshold value, commands are serviced from the short commands queue 504. When the command size tracker value is greater than or equal to the threshold value, a command is serviced from the long commands queue 506. In some examples, the completion manager 412 may delay sending completion messages corresponding to commands completed from the short commands queue 504 in order to ensure that the timed interval between sending completion messages is met. Thus, as shown in the timing graph 800, the completion messages for each command, S0, S1, L0, S2, S3, is sent at equal timed intervals, thus, satisfying a QoS requirement for receiving completion messages, by the host device 402, at constant timed intervals regardless of the order of which the commands are sent to the data storage device 404.

By queueing commands separately based on a command size threshold and executing the commands from each queue based on a command tracker value, QoS provided by the data storage device may be improved.

In one embodiment, a data storage device includes a memory device and a controller coupled to the memory device. The controller is configured to receive a command from a host device, wherein the command has a first size, determine that the first size is less than or equal to a threshold size, store the command in a first queue responsive to determining that the first size is less than or equal to the threshold size, increase a command size tracker value responsive to executing the command from the first queue, and execute a command stored in a second queue when the command size tracker value is greater than or equal to a threshold value, wherein the command stored in the second queue has a second size that is greater than the threshold size.

The controller is further configured to, responsive to executing the command stored in the second queue, decrease the command size tracker value by a value representative of the second size. The increasing is by a value representative of the first size. The threshold size and the threshold value are dynamically set. The threshold size and the threshold value are configured after a reset of the data storage device. The controller is further configured to send a completion message for each executed command. The completion message is sent based on a timed interval. The threshold size and the threshold value is based on the timed interval. The controller is further configured to execute commands out of order from an arrival order of the commands.

In one embodiment, a data storage device includes a memory device device and a controller coupled to the memory device. The controller includes a completion manager configured to send completion messages to a host device for executed commands received from the host device and a scheduler. The scheduler is configured to queue a command received from the host device having a size less than or equal to a threshold size in a first queue, queue a command received from the host device having a size greater than the threshold size in a second queue, determine to execute, based on a command size tracker value being less than or equal to a threshold value, a command from the first queue or, based on the command size tracker value being greater than the threshold value, a command from the second queue, and execute the command from the first queue or the command from the second queue based on the determining.

The scheduler is further configured to determine that the command size tracker value is greater than or equal to a threshold value. The command size tracker value is a total size of commands executed from the first queue minus a total size of commands executed from the second queue. The command size tracker value is increased by a value representative of a size of the command executed from the first queue and decreased by a value representative of a size of the command executed from the second queue. The scheduler is further configured to schedule the command from the second queue to execute responsive to determining that the command size tracker value is greater than or equal to the threshold value. The command from the second queue is executed subsequent to executing the command from the first queue. The scheduler comprises a queue control module. The queue control module is configured to keep track of a total size of commands executed from the first queue minus a total size of commands executed from the second queue. The scheduler is further configured to schedule the command from the second queue to execute when a timeout threshold for the command from the second queue has been exceeded. The completion messages sent to the host device are sent based on a timed interval. The completion manager is configured to delay sending completion messages associated with commands of the first queue or the second queue to satisfy the timed interval.

In another embodiment, a data storage device includes memory means and a controller coupled to the memory means. The controller is configured to determine that a command size tracker value exceeds a threshold value, wherein the command size tracker value is increased by a value representative of a size of a command executed from a first queue, wherein commands stored in the first queue have a size less than or equal to a threshold size, wherein the command size tracker value is decreased by a value representative of a size of a command executed from a second queue, wherein commands stored in the second queue have a size greater than the threshold size, and wherein the value representative of the size of the command executed from the first queue is less than the value representative of the size of the command executed from the second queue, and execute a command from the second queue when the command size tracker value exceeds the threshold value.

The controller includes a reordering queue module. The reordering queue includes the first queue and the second queue. One or more commands received by the controller are executed out of order from an arrival order. The controller is configured to send completion messages to a host device at constant intervals.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller comprises a command size tracker, and wherein the controller is configured to:
   receive a command from a host device, wherein the received command has a first command size;
   determine that the first command size is less than or equal to a threshold size;
   store the received command in a first queue responsive to determining that the first command size is less than or equal to the threshold size;
   store the received command in a second queue responsive to determining that the first command size is greater than the threshold size;
   execute a command stored in the first queue when a value of the command size tracker is less than a threshold value;
   execute a command stored in the second queue when the command size tracker value is greater than or equal to the threshold value; and
   adjust the command size tracker value responsive to executing a command stored in the first queue or the second queue, wherein the adjusting comprises:
   increasing the command size tracker value by a value representative of a total command size of commands executed from the first queue; and
   decreasing the command size tracker value by a value representative of a total command size of commands executed from the second queue, wherein the command size tracker value is equal to a value representative of command sizes of commands executed from the first queue minus a value representative of command sizes of commands executed from the second queue.

2. The data storage device of claim 1, wherein the threshold size and the threshold value are dynamically set.

3. The data storage device of claim 1, wherein the threshold size and the threshold value are configured after a reset of the data storage device.

4. The data storage device of claim 1, wherein the controller is further configured to send a completion message for each executed command.

5. The data storage device of claim 4, wherein the completion message is sent based on a timed interval.

6. The data storage device of claim 5, wherein the threshold size and the threshold value are based on the timed interval.

7. The data storage device of claim 1, wherein the controller is further configured to execute commands out of order from an arrival received order of the commands.

8. A data storage device, comprising:
   a memory device; and
   a controller coupled to the memory device, wherein the controller comprises:
   a completion manager configured to send completion messages to a host device for executed commands received from the host device; and
   a scheduler, wherein the scheduler is configured to:
   queue a command received from the host device having a first command size, wherein the received command is queued in a first queue if the first command size is less than or equal to a threshold size or queued in a second queue if the first command size is greater than the threshold size;
   determine to execute, based on a command size tracker value being less than or equal to a threshold value, a command stored in the first queue or, based on the command size tracker value being greater than the threshold value, a command stored in the second queue;
   execute the command stored in the first queue or the command stored in the second queue based on the determining; and
   adjust the command size tracker value responsive to the command being executed from either the first queue or the second queue, wherein the adjusting comprises:
   increasing the command size tracker value by a value representative of a command size of the command executed from the first queue; and
   decreasing the command size tracker value by a value representative of a command size of the command executed from the second queue, wherein the command size tracker value is equal to a value representative of a total command size of commands executed from the first queue minus a value representative of a total command size of commands executed from the second queue.

9. The data storage device of claim 8, wherein the scheduler is further configured to determine that the command size tracker value is greater than or equal to a threshold value.

10. The data storage device of claim 9, wherein the scheduler is further configured to schedule the command stored in the second queue to execute responsive to determining that the command size tracker value is greater than or equal to the threshold value, wherein the command from the second queue is executed subsequent to executing the command from the first queue.

11. The data storage device of claim 8, wherein the scheduler comprises a queue control module, and wherein the queue control module is configured to keep track of the command size tracker value.

12. The data storage device of claim 8, wherein the scheduler is further configured to schedule the command from the second queue to execute when a timeout threshold for the command from the second queue has been exceeded.

13. The data storage device of claim 8, wherein the completion messages sent to the host device are sent based on a timed interval.

14. The data storage device of claim 13, wherein the completion manager is configured to delay sending completion messages associated with commands of the first queue or the second queue to satisfy the timed interval.

15. A data storage device, comprising:
  memory means; and
  a controller coupled to the memory means, wherein the controller is configured to:
    determine that a command size tracker value exceeds a threshold value, wherein:
      the command size tracker value is increased by a value representative of a command size of a command executed from a first queue;
      commands stored in the first queue have a command size less than or equal to a threshold size;
      the command size tracker value is decreased by a value representative of a command size of a command executed from a second queue, wherein the command size tracker value is equal to a value representative of a total command size of commands executed from the first queue minus a value representative of a total command size of commands executed from the second queue; and
      commands stored in the second queue have a command size greater than the threshold size; and
    execute a command from the second queue when the command size tracker value exceeds the threshold value, wherein the threshold value is calculated based on:
      a predetermined constant value; and
      a time that the data storage device will take to execute the command.

16. The data storage device of claim 15, wherein the controller comprises a reordering queue module, wherein the reordering queue module comprises the first queue and the second queue, and wherein one or more commands received by the controller are executed out of order from an arrival order.

17. The data storage device of claim 15, wherein the controller is configured to send completion messages to a host device at constant intervals.

18. The data storage device of claim 1, wherein the threshold value is calculated based on:
  a predetermined constant value; and
  a time needed for the data storage device to execute the command.

* * * * *